Jan. 14, 1936.  A. CALLIER ET AL  2,027,675
MOTION PICTURE PROJECTOR
Filed Dec. 21, 1933
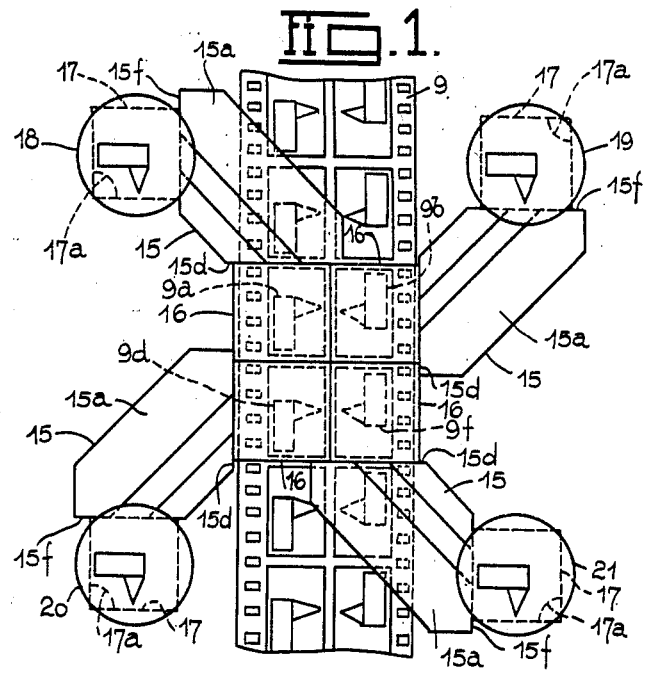
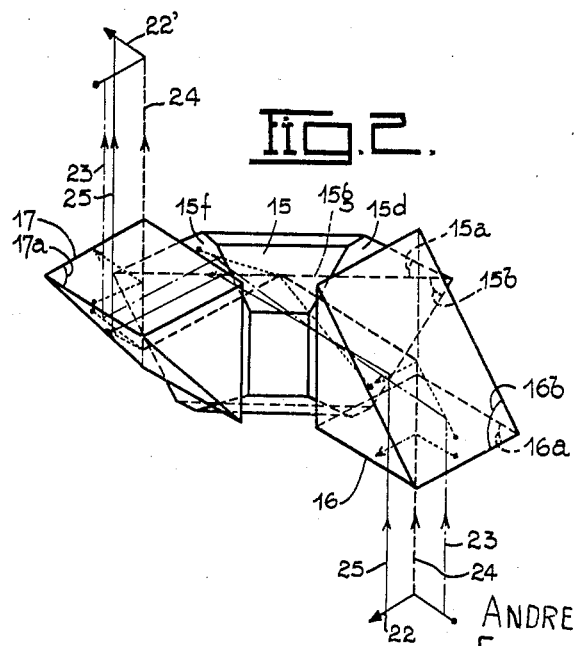
INVENTORS
ANDRE CALLIER
FERNAND HEGER
By Emil Bönnelycke
ATTORNEY Patented Jan. 14, 1936

UNITED STATES PATENT OFFICE 2,027,675

MOTION PICTURE PROJECTOR

André Callier, Gand, and Fernand Heger, Brussels, Belgium

Application December 21, 1933, Serial No. 703,464
In Belgium December 24, 1932

1 Claim. (Cl. 88—16.6)

The present invention relates to a colour motion picture projector by means of which four images are simultaneously projected through two pairs of colour filters, each pair being able to produce by additive synthesis the physiological impression of white.

Projectors of this kind are known, but they suppose the use of fractioned projecting lenses, or lenses of poor relative aperture, notably when the four images to be projected are placed one beside the other two by two on a normal size film.

In order to obviate these inconveniences, the apparatus according to the invention comprises prismatical combinations wihich separate from each other the light beams proceeding from each of the four images, in such a way that they are brought sufficiently far enough from one another, to allow, for the projection, the use of normal lenses of large relative aperture.

In particular, when the images are registered on a film of the normal type, in such a way that two images are positioned side by side in the breadth of the film, but require a rotation of 90° when projected, the optical projecting combination comprises between each image and its corresponding lens, a right angle roof prism, each of the right angle faces of which is coupled to an ordinary right angle prism, these two last prisms being placed in such a way that their free right angle faces are opposed and parallel to the plane of symmetry of the roof prism passing through the roof's edge.

The drawing annexed to the present specification shows, by way of example, an embodiment of the invention.

Figure 1 is a diagrammatic front view of a projecting apparatus for a film on which the images lay side by side and require a rotation of 90°.

Figure 2 is a perspective view of one of the four optical combinations whose purpose is to separate and rotate the images in the apparatus represented in Fig. 1.

In these two figures the same reference characters are used to indicate the same parts.

In the case of Fig. 1, where the images 9a, 9b, 9d, 9f on the film 9 require when projected a rotation of 90°, this rotation is effected at the same time as the separation. In this figure, the separation and the rotation are realized simultaneously by an optical combination, as shown in Fig. 2. This optical combination includes a right angled isosceles roof prism 15 whose roof consists of two faces 15a and 15b. Both end faces 15d and 15f of this roof prism, which are at right angles to one another, are cemented respectively with one of the cathetus faces of a normal right angled isosceles prism, respectively marked 16 and 17. These prisms are placed with their free cathetus faces 16a and 17a parallel to and on opposite sides of the plane of symmetry of the roof prism which passes through the edge 15g of the roof.

A subject, for instance that represented at 22 in Fig. 2, which is projected through an optical system according to the invention appears at the output as indicated at 22'.

Three rays of light 23, 24, 25 among those emitted by this subject have been drawn for representing the paths followed by the rays in this optical system.

The position of the image on the free cathetus face 16a of the ordinary right angled prism 16, on the hypothenuse face 16b of the same prism, on the roof faces 15b and 15a of the roof prism 15, on the hypothenuse face 17b of the other ordinary right angled prism and on the free cathetus face 17a of the latter has also been drawn.

The four optical combinations of Fig. 1 are disposed in such a way that the said plane of symmetry is perpendicular to the direction of projecmetry and that the prisms 17, which are not in front tion and that the images 9a, 9b, 9d, 9f to be projected, are substantially situated in the direction of the diagonals of the rectangle formed by these four images. The projecting lenses 18, 19, 20 and 21 are, in this manner, approximately equally separated from each other. The four images 9a, 9b, 9d, 9f on the film are represented in the free cathetus faces 17a as they are positioned relatively to the projecting lenses 18, 19, 20 and 21.

What we claim is:

A motion picture projector, comprising four projecting lenses for simultaneously projecting four neighboring images of a normal film on which these images are registered in such a way that two images lie side by side in each normal image space of the film but require to be rotated through 90° when projected, and an optical system between each image on the film and the corresponding projecting lens, each optical system consisting of a right angled isosceles roof prism of which the plane of symmetry which passes through the edge of the roof is perpendicular to the direction of projection, and of two ordinary right angled prisms cemented by one of their cathetus faces to one of the end faces of the roof prism, the two ordinary right angled prisms being arranged with their free cathetus faces parallel to and on opposite sides of the said plane of symmetry, the ordinary right angled prisms of each optical system being disposed in the direction of a diagonal of the rectangle formed by the four images to be simultaneously projected, one of these right angled prisms being in front of the corresponding image and the other in front of the corresponding projecting lens.

ANDRÉ CALLIER.
FERNAND HEGER.